United States Patent [19]

Pospischil

[11] Patent Number: 4,562,422
[45] Date of Patent: Dec. 31, 1985

[54] CMI DECODER

[75] Inventor: Reginhard Pospischil, Lochham, Fed. Rep. of Germany

[73] Assignee: Siemens Aktiengesellschaft, Berlin and Munich, Fed. Rep. of Germany

[21] Appl. No.: 571,003

[22] Filed: Jan. 16, 1984

[30] Foreign Application Priority Data

Jan. 27, 1983 [DE] Fed. Rep. of Germany ....... 3302761

[51] Int. Cl.$^4$ ............................................. H03M 5/12
[52] U.S. Cl. .............................. 340/347 DD; 360/44
[58] Field of Search ............ 340/347 DD; 360/40–44; 375/84, 87

[56] References Cited

U.S. PATENT DOCUMENTS

| | | | |
|---|---|---|---|
| 3,953,673 | 4/1976 | Dorward | 340/347 DD |
| 4,185,273 | 1/1980 | Gowan | 340/347 DD |
| 4,189,621 | 2/1980 | Scott | 375/45 |
| 4,276,649 | 6/1981 | Groenendaal et al. | 371/55 D |
| 4,325,053 | 4/1982 | Le Brozec et al. | 340/347 DD |

FOREIGN PATENT DOCUMENTS

| | | |
|---|---|---|
| 3031579 | 3/1982 | Fed. Rep. of Germany . |
| 3033351 | 4/1982 | Fed. Rep. of Germany . |
| 3125017 | 1/1983 | Fed. Rep. of Germany . |

OTHER PUBLICATIONS

IBM Technical Disclosure Bulletin (vol. 23, No. 7B, Dec. 1980).

Primary Examiner—L. T. Hix
Assistant Examiner—David M. Gray
Attorney, Agent, or Firm—Thomas H. Jackson

[57] ABSTRACT

The invention involves a decoder for converting CMI-coded signals into binary signals. Existing decoders of this type have a comparatively elaborate design and high power consumption. The invention teaches an improved decoder which has an AND gate and a NOR gate with at least two inputs each, where one input of the two gates is connected directly to the signal input, and the other input is connected via a delay element with a delay corresponding to one half of a bit period of the CMI-coded signals. Each of the outputs of the two gates are connected separately to the inputs of an OR gate with the binary signals being available at its output further features of the present embodiment are a clock pulse generator and a CMI code protocol violation monitor. The present decoder can be used for transmission devices for of digital signals with bit rates of approximately 140 Mbit/sec.

7 Claims, 4 Drawing Figures

CMI DECODER

BACKGROUND OF THE INVENTION

The invention relates to a Coded Mark Inversion CMI, decoder for converting CMI-coded signals into binary signals by means of a delay element and a subsequently added gating network.

The CMI code is known from the CCITT recommendation G703 in which it is provided for the 140-Mbit/-sec interfaces in the hierarchical structure of digital signal transmission. This code is a two-state NRZ code for which a zero signal is represented by the combination of a negative pulse of half-bit width, while the one signals appear alternatively as +1 signals of full-bit width.

A typical CMI decoder is disclosed in the Hewlett-Packard Company Service Manual for the test device "Error Detector" HP 3763 A, shown in FIG. A4-3, part 2. This known CMI decoder has two differential amplifiers arranged on the input side, with the output of one of the differential amplifiers connected directly to a gating network consisting of five OR-NOR gates, and the output of the other differential amplifier connected to that gating network via switchable delay elements. This results in a comparatively elaborate design in which high power consumption may become a problem for configurations using a remote power supply.

For monitoring CMI-coded signals, it has been suggested that the level of the input signal or a timing signal derived from it should be monitored. Since the receive level depends on the length and the status of the interface circuit as well as the content of the binary signal, no clearly defined monitoring results are provided. For example, even an interruption of the outer conductor of a coaxial cable will usually not result in a lowering of the level suitable for monitoring due to the use of controlled input equalizers with corresponding system reserve.

Nevertheless, such an interruption will result in incorrect equalization at the receive end due to the high degree of shifting in the equalizer's operating point; also, a drastic decrease in the signal-to-noise ratio will result without causing an error message.

SUMMARY OF THE INVENTION

The object of the present invention is to provide a less elaborate version of the type of CMI decoder already described, so that it is easier to monitor the received CMI coded signals.

A special advantage of this configuration, according to the invention is that the decoder can be constructed from standard components.

According to the invention, the object of the invention is accomplished by connecting the first inputs of a first AND gate and a NOR gate as well as the input of a first delay element with a delay of approximately one half-bit duration to the input for the CMI-coded signals; by connecting the second inputs of the first AND gate and the NOR gate to the output of the first delay element; and by separately connecting each of the outputs of the first AND gate and the NOR gate, to the two inputs of a first OR gate at the output of which the generated binary signals are available.

In preferred embodiments of the CMI decoder for generating binary signals of full-bit width, the D input of a first clocked D flipflop is connected to the output of the first OR gate and the Q output of the first D flipflop represents the output of the CMI decoder. For the generation of the clock pulse for the first D flipflop from the clock pulse with double bit frequency used during regeneration for the CMI-coded signals, a second delay element with a delay corresponding to one half of a bit duration is provided, with its input connected to the output of the first delay element. Further, the output of the second delay element is connected to the input of a second AND gate while a further input of the second AND gate is connected to the input for the CMI-coded signals. Also, the clock-pulse input of a first frequency divider stage and an inverting input of the second AND gate are connected to the clock-pulse input for the regeneration clock pulse. The output of the second AND gate is connected to the setting input of the first frequency divider stage; and the Q output of the first frequency divider stage is connected to the clock-pulse input of the first D flipflop. In a preferred embodiment for high data transmission rates, the D input of second clocked D flipflop is connected to the output of the first AND gate; the D input of a third clocked D flipflop is connected to the output of the NOR gate. The Q outputs of the second and third D flipflops are connected to the inputs of the first OR gate, and the output of this OR gate represents the output of the CMI decoder. In this embodiment, the D flipflops are clocked with the regeneration pulse and provided as the first or the second delay elements. For monitoring the CMI-coded signals, a code protocol comparator or violation monitor is provided with its first input connected to the output of the first AND gate and its second input connected to the output of the NOR gate. The inverting input of a third AND gate and the noninverting input of a fifth AND gate are connected to the first input. The inverting input of a fourth AND gate and the noninverting input of a sixth AND gate are connected to the second input of the code protocol violation monitor. Each of the outputs of the third and fourth AND gates are connected separately to the inputs of a second OR gate with its output connected to the clock-pulse input of a second frequency divider stage. The non-inverted inputs of the third AND gate and the sixth AND gate are connected to the inverting output $\overline{Q}$ of the second frequency divider stage. The noninverting inputs of the fourth AND gate and the fifth AND gate are connected to the noninverting output of the second frequency divider stage and each of the outputs of the fifth and sixth AND gates are connected separately to the inputs of a third OR gate with its output representing the output of the code protocol violation monitor. In the preferred embodiment for high data transmission rates, the first input of the code protocol violation monitor is connected to the inverting output $\overline{Q}$ of the second D flipflop and the second input of the code protocol violation monitor is connected to the inverting output of the third D flipflop. A seventh and eighth AND gate with 2 noninverting inputs each are provided in place of the third and the fourth AND gates and a ninth and a tenth AND gate with one inverting and one noninverting input each are provided in place of the fifth and sixth AND gates of the first described code protocol violation monitor.

Other features and advantages of the present invention will become apparent from the following detailed description, and from the claims.

For a full understanding of the present invention, reference should now be made to the following detailed description and to the accompanying drawings.

DETAILED DESCRIPTION

Figure 1:
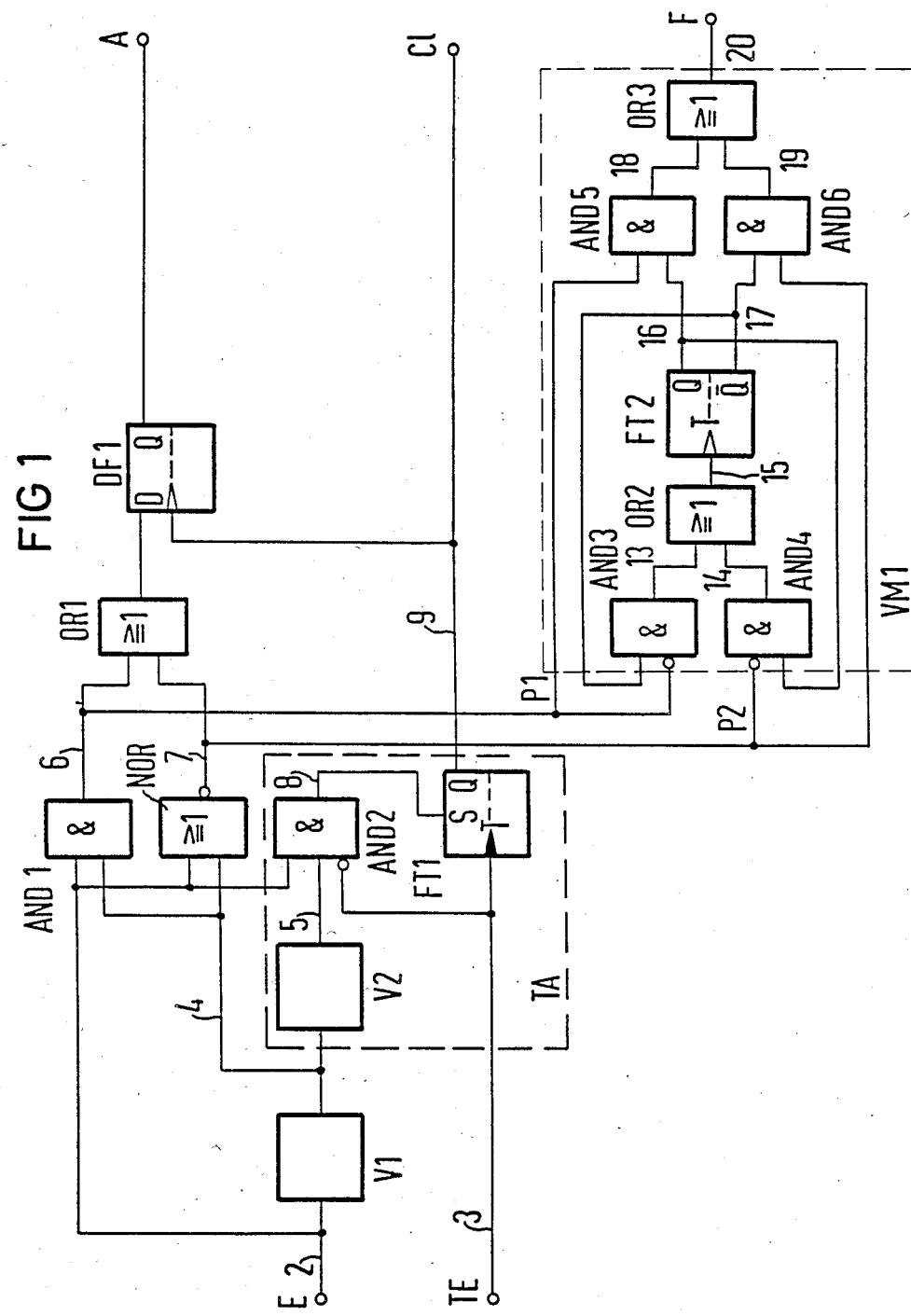
FIG. 1 shows the circuit diagram for the logic elements of a CMI decoder according to the invention.

The CMI decoder, shown in FIG. 1, contains an input E for the CMI-coded signals, which could, for example, come from a regenerator and a clock-pulse input TE, where the clock pulse required for regeneration is available at a frequency corresponding to twice the gross bit rate of the CMI-coded signals. The input of a first delay element V1 with a delay of approximately one half of a bit duration, and one input each of a first AND gate AND1 and a NOR gate NOR, are connected to input E in parallel. The output of the first delay element V1 is connected to the second inputs of the first AND gate AND1 and the NOR gate NOR.

The outputs of each of these two gates are connected separately to the inputs of a first OR gate OR1, at the output of which the generated binary signals are available. These generated binary signals show varying lengths; in addition to the pulses of full-bit width, pulses of half-bit width occur as well. For this reason, the D input of a first D flipflop DF1, which is triggered with the CMI-coded or binary signals, is connected to the output of the first OR gate OR1. At the noninverting output Q of this D flipflop, the binary signals in each case are available as pulses or full-bit width so that the Q output of this flipflop is connected directly to output A of the CMI decoder.

A configuration TA for clock-pulse derivation containing a second delay element V2, having a delay also corresponding to one half of a bit duration of the CMI-coded or binary signals, is provided for the generation of the bit timing for the first D flipflop DF1. One of the noninverting inputs of a second AND gate AND2 is connected to the output of the second delay element while one of its other noninverting inputs is connected to the input E of the CMI decoder. An inverting input of the second AND gate AND2 and a clock-pulse input of a first frequency divider stage FT1 are connected to the input TE for the clock pulse coupled with the gross bit rate. The setting input S of the first frequency divider stage FT1 is connected to the output of the second AND gate AND2, while the noninverting output Q of the first frequency divider provides the required clock pulse C1.

The first and second inputs, P1 and P2, of a code protocol comparator or violation monitor VM1 are connected to the outputs of the first AND gate AND1 and the NOR gate NOR.

An inverting input of a third AND gate AND3 and a noninverting input of a fifth AND gate AND5 are connected to the first input P1, while the inverting input of a fourth AND gate AND4 and the noninverting input of a sixth AND gate AND6 are connected to the second output P2.

Each of the outputs of the two AND gates, AND3 and AND4, are connected separately to the inputs of a second OR gate OR2. The output of this second OR gate is connected to the clock-pulse input of a second frequency divider stage FT2. Other noninverting inputs of the fourth AND gate AND4 and the fifth AND gate AND5 are connected to the noninverting output Q of the second frequency divider stage FT2, while noninverting inputs of the third AND gate AND3 and the sixth AND gate AND6 are connected to the inverting output $\overline{Q}$ of the second frequency divider stage FT2. Each of the outputs of the fifth and sixth gates, AND5 and AND6, are connected separately to the inputs of a third OR gate OR3 at the output F of which fault pulses occur in the case of code protocol violations in the received CMI-coded signal.

Figure 2:
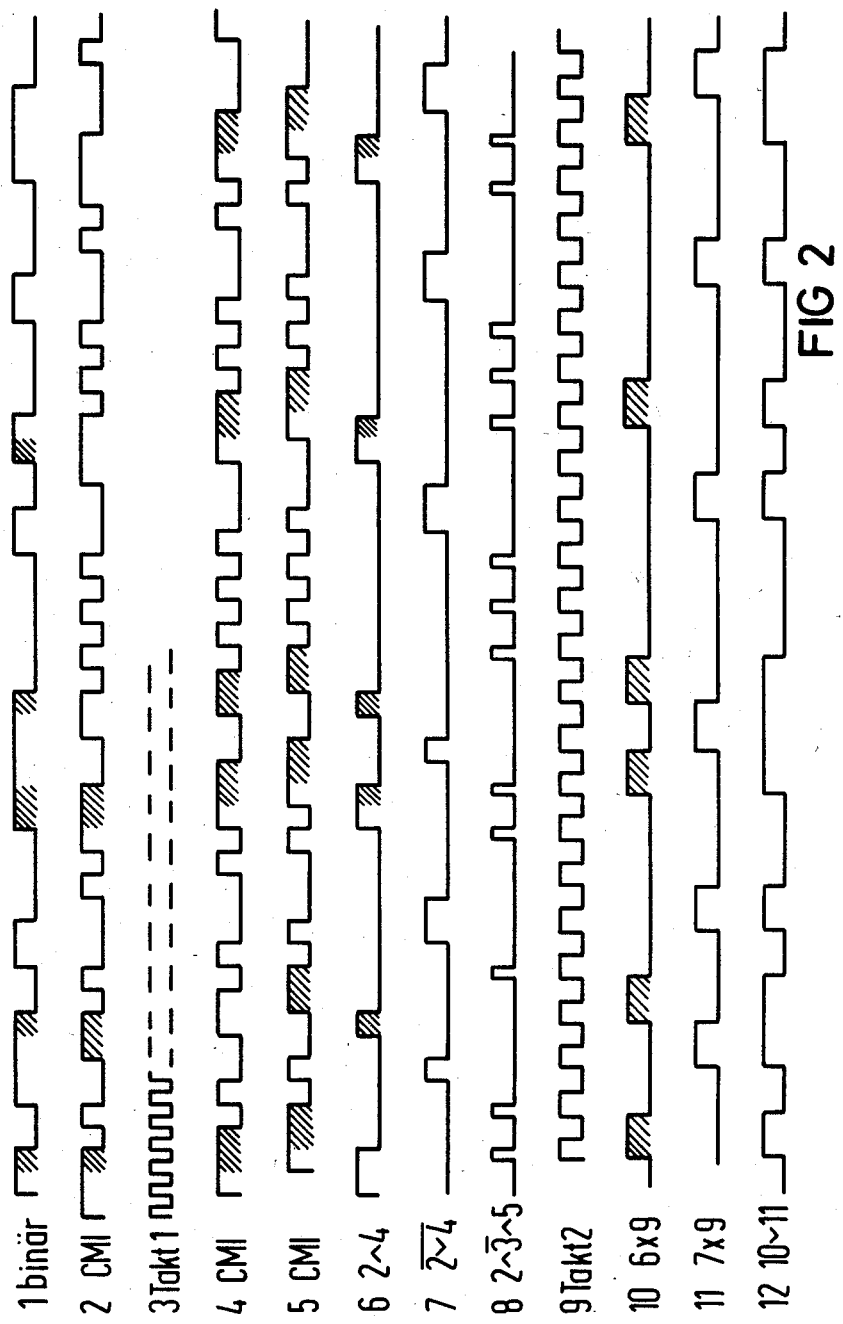
FIGS. 2 and 3 show timing diagrams for the CMI decoder according of FIG. 1.

The timing diagram, according to FIG. 2 explains the operation of the CMI decoder with the configuration TA for clock-pulse derivation and the code protocol violation monitor VM shown in FIG. 1.

The first line of the timing diagram shows the binary output signal which is transmitted in the form of a CMI-coded signal and waits at the input E in the form shown on line 2. The numbers contained in FIGS. 1 and 4 refer to the corresponding line in the timing diagram (FIGS. 2 and 3) in which the respective signal is shown. In line 3 of the timing diagram, the first signal pulse waiting at input TE is shown; this signal pulse, which is used for the regeneration of the CMI-coded signals, has twice the gross bit rate of the CMI-coded signals. As can be seen, the CMI signal waiting at the input is delayed at the output of the first delay element V1 and by one half of the bit period according to line 4, and by an additional half of a bit period at the output of the second delay element V2. Combining the input signal with the signal delayed by one half of a bit period results in signal 6 at the output of the first AND gate, and in signal 7 at the output of the NOR gate. While signal 6 contains positive pulses only for the binary 1-signals that were transferred with positive polarity in the CMI-coded signal, signal 7 contains positive pulses only for those binary 1-signals that were transferred with polarity 0 in the CMI code. According to the CMI code protocol, the pulses of signals 6 and 7 alternate during interference-free transmission so that the duration of these signals is one half or one full bit period, respectively. Hence, a violation of the CMI code protocol would mean that between two consecutive 1-signals at the outputs of the first AND gate AND1 or NOR gate NOR no pulse appears at the other respective output.

Figure 3:
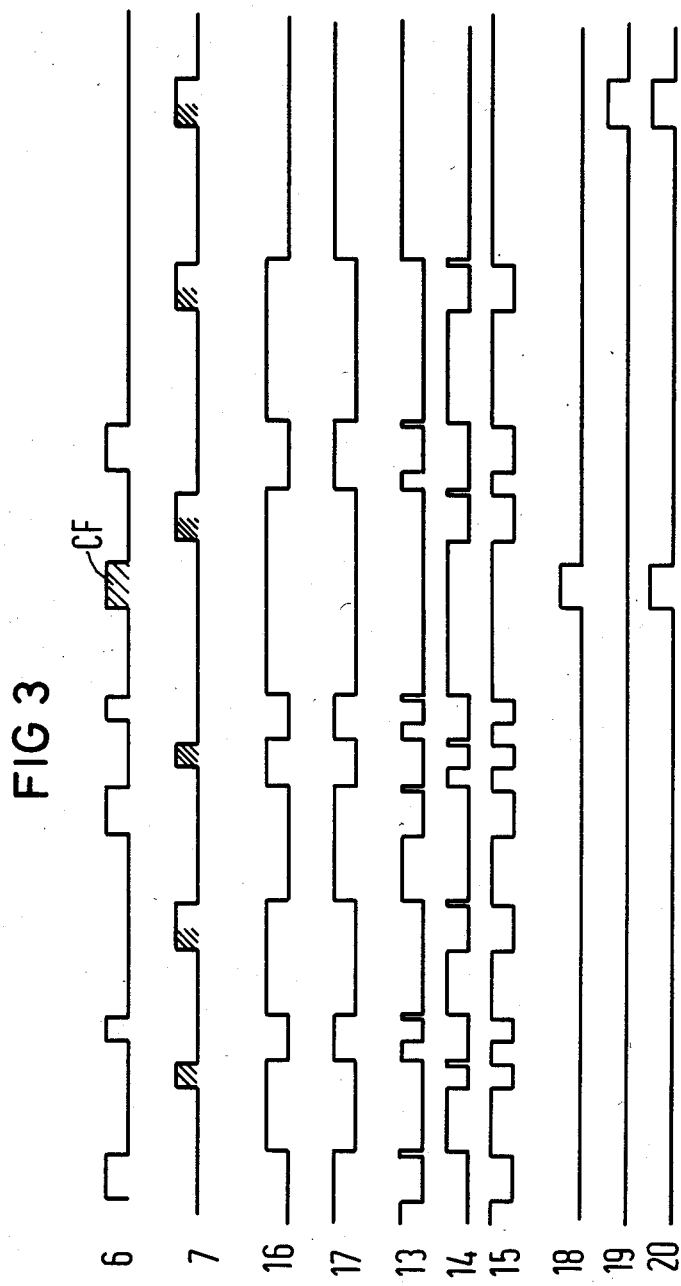

FIG. 3 is provided to explain the function of the first code protocol comparator VM1. The pulses shown in lines 6 and 7 appear also at the inputs P1 and P2 of the code protocol violation monitor VM1 and hence, at the inverting inputs of the third and fourth AND gates arranged at the input side of the code protocol violation monitor VM1. Therefore, these AND gates are blocked when pulses occur (c.f. lines 13 and 14) and the fifth and sixth AND gates, AND5 and AND6, contained in the violation monitor VM1, are opened according to lines 18 and 19. Therefore, a departure from the alternating occurrence of pulses due to the code fault pulse CF in lines 6 or 7 or the timing diagram, according to FIG. 3, results in the second frequency divider stage FT2 consisting of another J-K flipflop, according to line 15, not being switched over. Therefore, two 1-signals are waiting at the inputs of the fifth and sixth AND gates which, via a 1-signal at one of the inputs of the third OR gate according to lines 18 or 19, result in a fault pulse at output F, according to line 20, with a duration corresponding to the signal pulses of lines 6 or 7.

The generation of bit timing CI, according to line 9, occurs by means of the first frequency divider stage FT1 which is implemented as a J-K flipflop. In order to prevent a phase uncertainty of 180° the first frequency divider stage must be set for this with the output signal of the second AND gate AND2. The output signal of the second AND gate shown in line 8 was generated by an AND operation of the delayed CMI-coded input signal 2, having a delay of one bit duration with the inverse timing signal with an increased gross bit rate and with the nondelayed input signal according to line 2.

Further processing of the fault pulses occurring at error output F of the code protocol violation monitor may experience interference because these pulses may have a duration corresponding to one half or one full-bit duration. Therefore, it is practical to connect another D flipflop controlled by the clock pulse, according to line 9, on the outlet side of the fault pulse output F.

Figure 4:
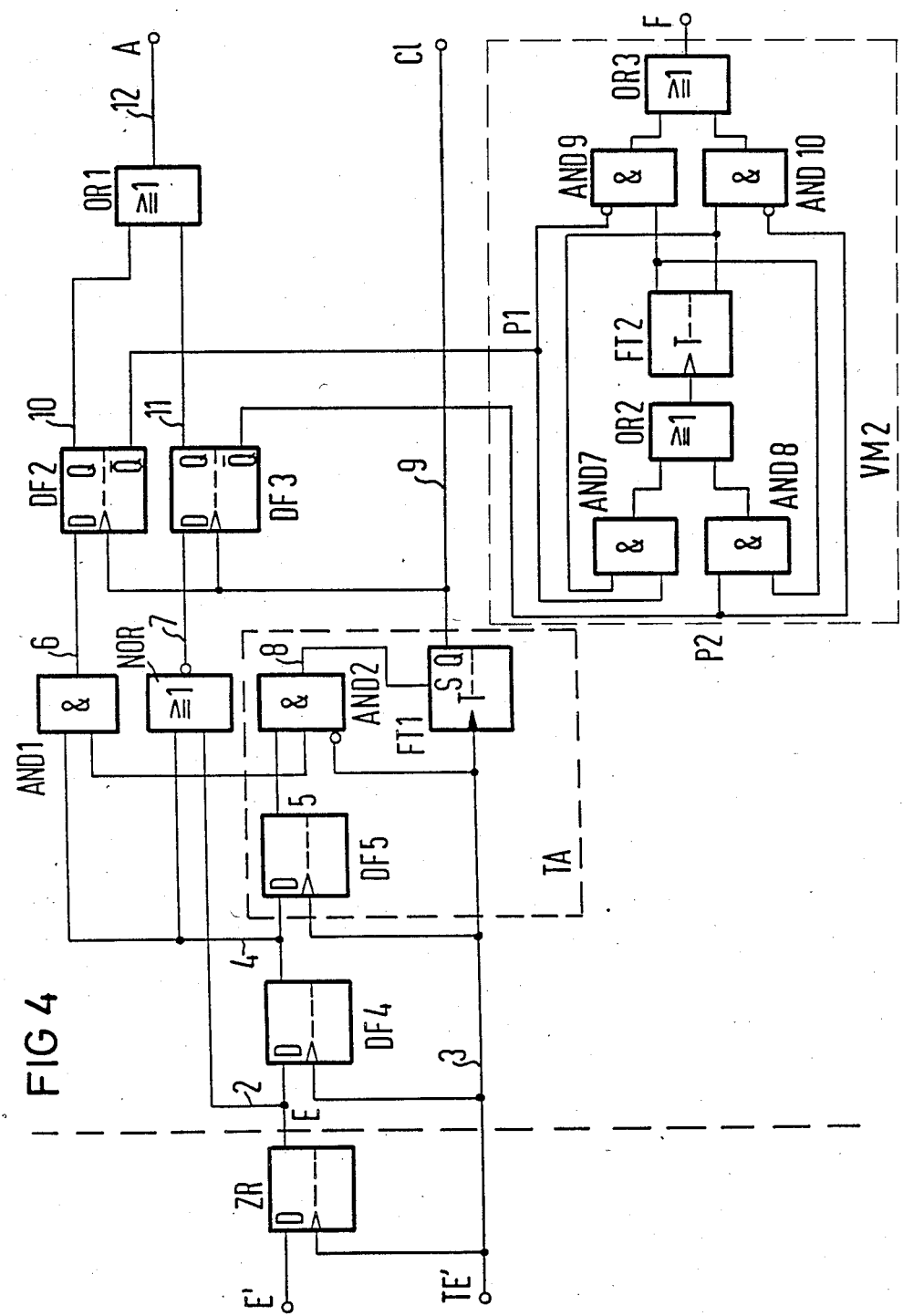
FIG. 4 shows the circuit diagram for the logic elements of a CMI decoder, according to the invention, and designed especially for high transmission speeds.

FIG. 4 shows a CMI decoder with a clock-pulse derviation circuit TA and a modified code protocol violation monitor VM2 which is especially practical for high transmission speeds. A time regenerator ZR, in the form of a clocked D flipflop by means of which the exact time slot of the CMI pulse is regenerated, is connected in series to the input E of the CMI decoder. To ascertain fault detection during high transmission speeds it has proven practical to convert the output signals of the first AND gate and AND1 and of the NOR gate NOR, according to lines 6 and 7, to pulses of full-bit width. For this purpose, the D input of a second clock D flipflop DF2 is connected to the output of the first AND gate AND1, and the D input of a third D flipflop DF3, clocked with the bit timing, is connected to the output of the NOR gate. The pulses, according to lines 10 and 11, waiting at the noninverting Q outputs of these flipflops are subsequently combined with one another in the first OR gate OR1, connected on the outlet side, to form the output signal according to line 12.

Since the uses of D flipflops also generates inverse output signals, a seventh and eighth AND element with two noninverting inputs can also be used, appropriately connected, in place of the third and fourth AND element with one inverse input each. In this case, also the fifth and the sixth AND gate, AND5 and AND6, must also be replaced by a ninth and a tenth AND gate, AND9 and AND10, with one inverting and one noninverting input each.

The code protocol violation monitor VM1, according to FIG. 1, can also be used; its inputs P1 and P2 must, in this case, be connected to the Q outputs of the second and third D flipflops, DF2 and DF3.

In view of a simplified design using integrated technology, the first and second delay element, V1 and V2, of the CMI decoder shown in FIG. 1, are implemented in FIG. 4 by means of the fourth and fifth D flipflops, DF4 and DF5.

There has thus been shown and described a novel CMI decoder which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A CMI decoder for converting CMI-coded signals into binary signals by means of a delay means and a subsequently added gating network, comprising, in combination
   (a) means for generating decoded binary signals of full bit width, first inputs of a first AND gate and of a NOR gate as well as the input of a first delay element with a delay of approximately one half of a bit duration being connected to an input for the CMI-coded signals; second inputs of the first AND gate and of the NOR gate being connected to the output of the first delay element; and each of the outputs of the first AND gate of the NOR gate being connected separately to the two inputs of the first OR gate, the D input of a first clocked D flipflop being connected to the output of the first OR gate and the Q output of the first D flipflop representing the binary output signals of full bit width of the CMI decoder, and
   (b) means for generating the clock pulse for the first D flipflop from a clock pulse with double bit frequency used during regeneration for the CMI-coded signals, a second delay element with a delay corresponding to one half of a bit duration being provided, with its input connected to the output of the first delay element, the output of the second delay element being connected to the input of a second AND gate; a further input of the second AND gate being connected to the input for the CMI-coded signals; the clock-pulse input of a first frequency divider stage and an inverting input of the second AND gate being connected to the clock-pulse input for the regeneration clock pulse; the output of the second AND gate being connected to the setting input of the first frequency divider stage; and the Q output of the first frequency divider stage being connected to the clock-pulse input of the first and second D flipflops.

2. A CMI decoder for converting CMI-coded signals into binary signals by means of a delay means and a subsequently added gating network, comprising, in combination
   (a) means for generating decoded binary signals of full bit width first inputs of a first AND gate and of a NOR gate being connected to the output of a first delay element with a delay of approximately one half of a bit duration, the first delay element being connected to an input for the CMI-coded signals; a second input of the NOR gate being also connected to an input for CMI-coded signals; the D input of a second clocked D flipflop being connected to the output of the first AND gate; the D input of a third clocked D flipflop being connected to the output of the NOR gate; the Q outputs of the second and third D flipflops being connected to the inputs of a first OR gate; and the output of this OR gate representing the output of the CMI decoder
   (b) means for generating the clock pulse for the second and third D flipflops from the clock pulse with double bit frequency used during regeneration for the CMI-coded signals, a second delay element with a delay corresponding to one half of a bit duration being provided, with its input connected to the output of the first delay element; the output of the second delay element being connected to the input of a second AND gate; a further input of the second AND gate being connected to the second input of the first AND gate; the clock-pulse input of a first frequency divider stage and an inverting input of the second AND gate being connected to the clock-pulse input for the regeneration clock pulse; the output of the second AND gate being connected to the setting input of the first frequency divider stage; and the Q output of the first frequency divider stage being connected to the clock-pulse input of the second and third D flipflops.

3. The CMI decoder according to claim 1, wherein at least one further D flipflop is clocked with an input to the means for generating a clock pulse for the first D flipflop and is provided as the first or the second delay element.

4. The CMI decoder according to claim 2, wherein at least one further D flipflop is clocked with an input to the means for generating the clock pulse for the second and third D flipflops is provided as the first or the second delay element.

5. A CMI decoded for converting CMI-coded signals into binary signals by means of a delay element and a subsequently added gating network, comprising, in combination, (a) means for generating decoded binary signals, first inputs of a first AND gate and of a NOR gate as well as the input of a first delay element with a delay of approximately one half of a bit duration being connected to an input for the CMI-coded signals; the second inputs of the first AND gate and of the NOR gate being connected to the output of the first delay element; and each of the outputs of the first AND gate and of the NOR gate being connected separately to the two inputs of a first OR gate at the output of which the generated binary signals are available, and (b) means for monitoring the CMI-coded signals, a code protocol violation monitor being provided with its first input connected to the output of the first AND gate and its first input connected to the output of the first AND gate and its second input connected to the output of the NOR gate; the inverting input of a third AND gate and the noninverting input of a fifth AND gate being connected to the first output; the inverting input of a fourth AND gate and the noninverting input of a sixth AND gate being connected to the second input of the code protocol violation monitor; each of the outputs of the third and fourth AND gate being connected separately to the inputs of a second OR gate with its output connected to the clock-pulse input of a second frequency divider stage; the non-inverted inputs of a third AND gate and the sixth AND gate being connected to the inverting output $\overline{Q}$ of the second frequency divider stage; the noninverting inputs of the fourth AND gate and fifth AND gate being connected to the noninverting output of the second frequency divider stage; and each of the outputs of the fifth and sixth AND gates being connected separately to the inputs of a third OR gate with its output representing the output of the code protocol violation monitor.

6. The CMI decoder according to claim 1, wherein for monitoring the CMI-coded signals, a code protocol violation monitor is provided with its first input connected to the output of the first AND gate and its second input connected to the output of the NOR gate; the inverting input of a third AND gate and the noninverting input of a fifth AND gate being connected to the first output; the inverting input of a fourth AND gate and the noninverting input of a sixth AND gate being connected to the second input of the code protocol violation monitor; each of the outputs of the third and fourth AND gate being connected separately to the inputs of a second OR gate with its output connected to the clock-pulse input of a second frequency divider stage; the noninverted inputs of the third AND gate and the sixth AND gate being connected to the inverting output $\overline{Q}$ of the second frequency divider stage: the noninverting inputs of the fourth AND gate and the fifth AND gate being connected to the noninverting output of the second frequency divider stage; and each of the outputs of the fifth and sixth AND gates being connected separately to the inputs of a third OR gate with its output representing the output of the code protocol violation monitor.

7. The CMI decoder according to claim 2, further comprising a code protocol violation monitor, the first input of the code protocol violation monitor being connected to the inverting output $\overline{Q}$ of the second D flipflop, and the second input of the code protocol violation monitor being connected to the inverting output of the third D flipflop; a seventh and eighth AND gate with 2 noninverting inputs each being provided for receiving the first and second inputs of the code protocol violation monitor and a ninth and tenth AND gate with one inverting and one noninverting input each being provided the outputs of the seventh and eighth AND gates being connected to a second OR gate whose output is connected to a second frequency divider stage whose outputs are provided to second noninverting inputs of the seventh, eighth, ninth and tenth AND gates the inverting inputs of the ninth and tenth AND gates also for receiving the first and second inputs of the code protocol violation monitor, one outputs of the ninth and tenth AND gates being connected to a third OR gate whose output represents the output of the code protocol violation monitor.

* * * * *